INVENTOR.
HENRY W. BOYLAN
BY
HIS ATTORNEY

United States Patent Office 2,809,620
Patented Oct. 15, 1957

2,809,620

IGNITION APPARATUS

Henry W. Boylan, Flint, Mich., assignor to General Motors Corporation, Detroit, Mich., a corporation of Delaware Application June 27, 1956, Serial No. 594,292

5 Claims. (Cl. 123—117)

This invention relates to an engine control system and is particularly concerned with an ignition timing control system for use in connection with internal combustion engines and the like.

It is the main object of the invention to provide a control system which will cause the engine to warm up quickly and this is accomplished by retarding the ignition timing through an overriding device on the conventional vacuum control used on ignition distributors which overriding device is responsive to the heat of the engine whereby the operation of the vacuum control device is reinstated after the engine warms up. An auxiliary vacuum control is also provided to regulate the ignition timing within a limited range during the period that the overriding device is effective.

Another object of the invention is to provide a system for regulating the ignition timing of an internal combustion engine whereby the temperature of the engine may be increased rapidly from a cold start and wherein the means for accomplishing this end may be rendered ineffective after a predetermined engine temperature is obtained.

A still further object of the invention is to provide a control system that will cause the engine to warm up quickly without affecting the power and timing at idling speeds. This is accomplished by positioning the suction port for the vacuum control device on the low vacuum side of the throttle valve so that when the engine is idling, the suction is low.

Further objects and advantages of the present invention will be apparent from the following description, reference being had to the accompanying drawings wherein a preferred embodiment of the present invention is clearly shown.

The use of hot water heaters in automobiles is entirely dependent upon the engine temperature since the cooling water used for the engine is the heating medium used in connection with the automotive heater. For this reason, it is desirable to control the heating cycle of the engine to elevate the water temperature to a predetermined degree as quickly as possible so that the heater may become useful within a short period of the initial start of the engine.

In present day automobile ignition systems, the ignition timing is automatically advanced almost instantaneously upon start of the engine and it is a well known fact that an engine heats up more slowly with advanced ignition timing than with retarded ignition timing. In fact, if the timing is maintained retarded after the engine starts, overheating will develop within a relatively short period of time. The present invention is directed to a system whereby the normal advance mechanism of an automotive ignition system is overridden to prevent advance of the timing until such time as the engine has warmed up to a predetermined temperature.

One type of conventional distributor used in an automotive ignition system includes an automatic timing control which is accomplished through the use of a vacuum device attached to the distributor plate and controlled by the vacuum at the carburetor. Thus, when the engine is idle, there is no suction and the vacuum control device, which is spring loaded, causes the distributor to be moved to a fully retarded position whereas when the engine starts, suction is applied an the vacuum control device advances the timing by rotating the distributor plate a predetermined angle to advance the timing. The vacuum control generally operates in combination with a centrifugal control device which also advances the timing in direct proportion to the engine speed. Thus, the two control devices, responsive to engine suction and speed, cooperate to control properly the ignition timing. A distributor of this type is clearly disclosed in Crawford et al. Patent 2,107,470. Other distributors used in the automotive industry depend entirely on engine suction for their control. The present system of heat control may be applied to either type of distributor with minor adjustments well known to persons skilled in the art.

Figure 2:
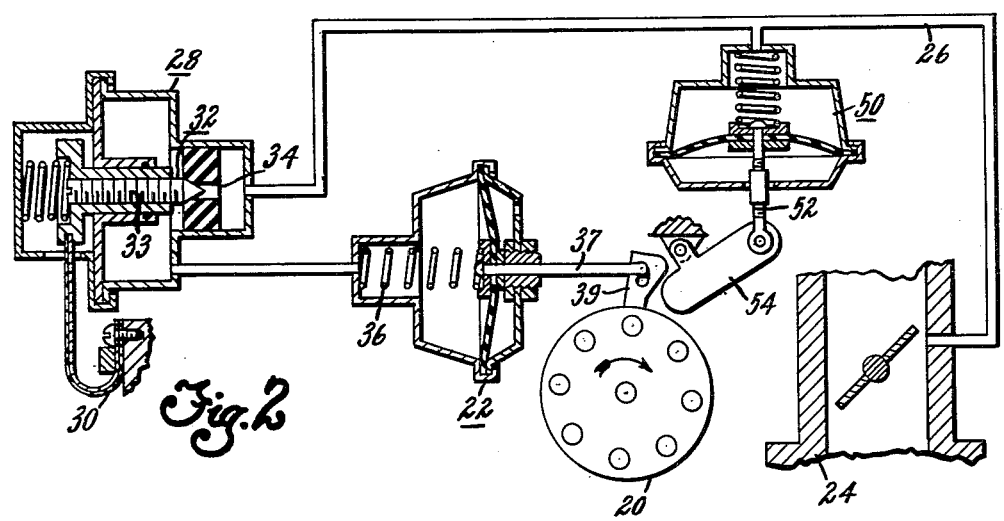
Figure 2 is a view similar to Figure 1 wherein the engine has been started and is running cold.
Figure 3:
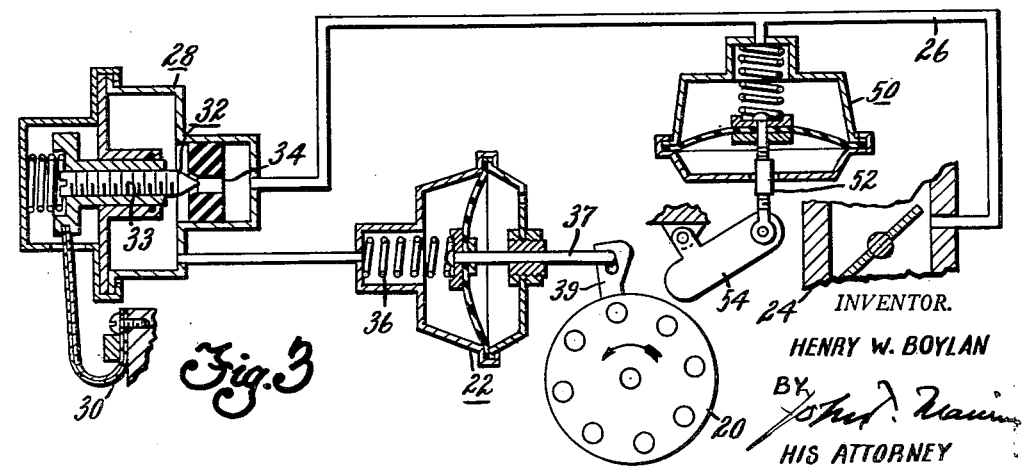
Figure 3 is a view similar to Figure 1 wherein the engine has warmed up and is running normally.

In the present invention, a distributor and vacuum control device are shown at 20 and 22, respectively, while the intake portion of a down draft carburetor is shown diagrammatically at 24 wherein air is drawn in from the top to mix with fuel and then the fuel-air mixture is drawn into the manifold (not shown). The vacuum passage 26 from the carburetor, which is normally connected to the vacuum control device 22, passes through a temperature responsive control mechanism 28. This mechanism is controlled by suitable thermostatic means such as a bimetal 30 which is responsive to engine water temperature and which is adjustable to operate a valve 32 by moving a valve stem 33 into and out of engagement with an orifice 34. When the engine water is cold, the bimetal 30 moves the valve stem 33 to the right to close the orifice 34 whereby engine vacuum conditions which may subsequently exist in the line 26 are not transmitted to the vacuum control device 22. For this reason, the vacuum control device 22, through the medium of a spring 36, causes the linkage 37 to move the distributor plate control arm 39 toward the right thereby rotating the distributor plate (not shown) in a clockwise direction for retarding the ignition timing. In this position, the engine is started and is running cold. However, in order to further retard the timing and make the engine warm up still faster, an auxiliary vacuum control device 50 is used which is similar in all respects to the device 22 and which is also connected to the vacuum line 26. The device 50 operates through link 52 through a camming lever 54 which, when the engine is in start position, acts as a stop to limit clockwise movement of arm 39 and also acts as a stop against the spring-loaded action of the primary control device 22. However, as soon as the engine is started as shown in Figure 2, and suction is impressed in the line 26, the vacuum device 50 is pulling upwardly moving the cam lever 54 out of the way of the control arm 39 of the distributor plate whereby the spring 36 in vacuum device 22 further retards the ignition by moving the distributor plate still further in a clockwise direction. During this entire operation, the temperature responsive valve 28 is closed so that the primary vacuum control device 22 is unaffected by suction in the line 26. As the engine water begins to warm up, bimetal 30 deflects toward the left and opens the valve 32 whereby suction in line 26 is impressed on the diaphragm of the vacuum control device 22. This causes the diaphgram to move toward the left against the action of spring 36. This movement through the linkages advances the ignition timing by rotating the distributor plate in a counterclockwise position whereupon the engine thereafter operates under normal conditions.

Figure 1:
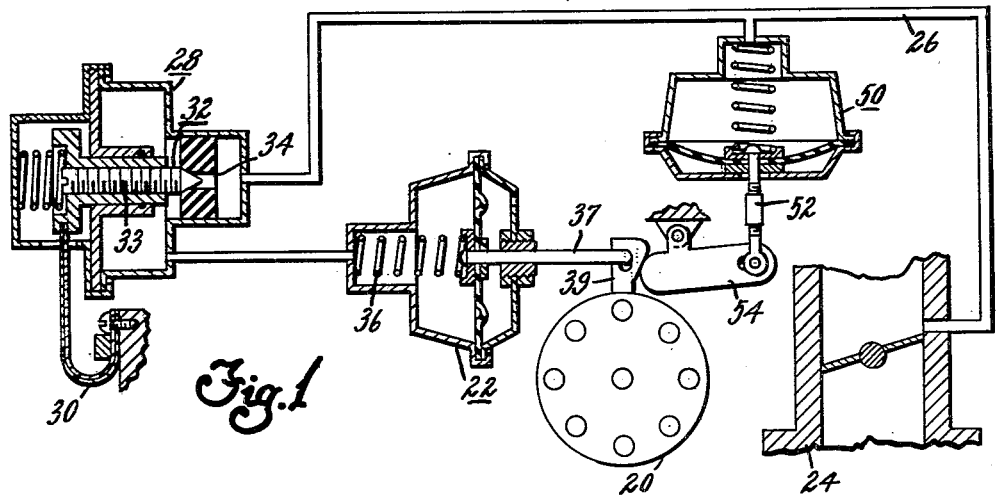
Figure 1 is a diagrammatic view of the ignition timing control system showing a portion of the carburetor, ignition distributor, vacuum control devce and the temperature-controlled overriding means wherein the system is shown in the cold start position.

It is quite apparent that when the engine is inactive so that no suction exists in the line 26, the primary and auxiliary vacuum devices 22 and 50 are reinstated to the positions shown in Figure 1 wherein the camming lever 54 moves the arm 39 from its normal position shown in Figure 2 to a partially advanced position. Obviously, the force components created by the leverage at 52 and 54 and the spring in device 50 must be sufficient to overcome the effect of the spring in device 36 in order to move the arm 39 to the start position. This partial advance is useful upon initial starting of the engine.

It is to be understood that the use of the auxiliary vacuum device 50 prevents excessive retarding of the ignition timing which would sometimes cause difficulty in starting the engine and thereafter permits full retarding of the ignition timing to improve the fast warm up effect. However, it is to be understood that the device 50 may be eliminated if desired without defeating the purpose of the invention since even though the device 50 is not used, the engine will warm up more rapidly due to the retarded condition of the spark during initial operation thereof. In this connection, however, when the device 50 is not used, the adjustment of the position of the distributor plate should be such that the plate is in the position shown in Figure 1 when the vacuum control device 22 is in the position shown in Figure 2.

Another system for accomplishing a somewhat similar result is disclosed in application, S. N. 594,303, assigned to the assignee of the present invention and filed concurrently herewith.

While the embodiments of the present invention as herein disclosed constitute preferred forms, it is to be understood that other forms might be adopted.

What is claimed is as follows:

1. In a control system for the ignition timing of an internal combustion engine, the combination comprising; an ignition timer movable to positions for advanced and retarded ignition timing of the engine, a vacuum motor connected to said timer and normally biased to move the timer to a position for retarding the ignition timing of the engine, the suction line connecting the vacuum motor to a source of engine suction whereby the vacuum motor is adapted to move against the bias for moving the timer to a more advanced position of ignition timing when the engine suction reaches a predetermined value upon operation of the engine, thermo-responsive valve means interposed between said vacuum motor and said suction source, said valve means being normally closed during initial engine operation for nullifying the action of said vacuum motor with respect to the ignition timing and adapted to open upon engine warm-up for permitting said vacuum motor to control said timer in accordance with engine suction.

2. In a control system for the ignition timing of an internal combustion engine, the combination comprising; an ignition timer to a vacuum motor connected to said timer and normally biased to move the time to a position for retarding the ignition timing of the engine, the suction line connecting the vacuum motor to a source of engine suction whereby the vacuum motor is adapted to move against the bias for moving the timer to a more advanced position of ignition timing when the engine suction reaches a predetermined value upon operation of the engine, normally closed valve means interposed between the vacuum motor and said suction source for nullifying the action of said vacuum motor on said ignition timer, thermo means responsive to engine temperature acting on said valve means and adapted when the engine reaches a predetermined temperature to open said valve means for reinstating the control of said vacuum motor in accordance with engine suction.

3. The control system as claimed in claim 1 including a second vacuum motor responsive to engine suction and adapted to prevent full retarding of the ignition timer when the engine is idle, said second suction means being responsive upon application of suction as occasioned by the operation of the engine to permit said ignition timer to be fully retarded only after the engine has started, said second vacuum motor being ineffective thereafter until the engine is stopped.

4. In a control system for the ignition timing of an internal combustion engine, the combination comprising; an ignition timer biased to a position of retarded ignition timing, a control device connected directly to said timer and normally responsive to engine operation to move the timer to a position of more advanced ignition timing, means responsive to engine temperature for nullifying the action of the control device under certain conditions, said means being ineffective upon engine warm-up whereby the normal operation of the control device is reinstated.

5. A control system for the ignition timing of an internal combustion engine, comprising in combination, an ignition timer, movable to positions of advanced and retarded ignition timing, a first control device operable to move the ignition timer to either of said two positions and normally biased to a position of retarded ignition timing, a second control device for nullifying the action of the first control device to move the timer to said retarded position; a third control device for nullifying the action of the first control device to move the timer toward a position of advanced ignition timing, said first and second control devices being responsive to engine suction and said third control device being responsive to engine temperature where the second device is rendered inoperative to nullify action of the first device upon starting of the engine and the third device is rendered inoperative to nullify action of the first device upon heating up of the engine due to operation thereof so that the first control device becomes fully effective to regulate the ignition timer.

References Cited in the file of this patent

UNITED STATES PATENTS

| | | |
|---|---|---|
| 1,560,760 | Chaplin | Nov. 10, 1925 |
| 2,378,037 | Reggio | June 12, 1945 |
| 2,451,289 | Jarvis | Oct. 12, 1948 |